United States Patent
Schweizer

(10) Patent No.: US 7,689,340 B2
(45) Date of Patent: Mar. 30, 2010

(54) METHOD AND DEVICE FOR CONTROLLING THE OPERATION OF A PARALLEL SHIFTING TRANSMISSION

(75) Inventor: Alexander Schweizer, Buehl (DE)

(73) Assignee: LuK Lamellen und Kupplungsbau Beteilgungs KG, Buehl (DE)

( * ) Notice: Subject to any disclaimer, the term of this patent is extended or adjusted under 35 U.S.C. 154(b) by 0 days.

(21) Appl. No.: 12/231,736

(22) Filed: Sep. 5, 2008

(65) Prior Publication Data

US 2009/0105917 A1    Apr. 23, 2009

Related U.S. Application Data

(63) Continuation of application No. PCT/DE2007/000293, filed on Feb. 15, 2007.

(30) Foreign Application Priority Data

Mar. 8, 2006    (DE) ................ 10 2006 010 628

(51) Int. Cl.
   *G06F 17/00* (2006.01)
(52) U.S. Cl. ............... 701/67; 701/55; 701/64
(58) Field of Classification Search ............ 701/67–68, 701/51, 55–58, 64, 95; 477/34, 37–39, 70
   See application file for complete search history.

(56) References Cited

U.S. PATENT DOCUMENTS 5,342,258 A * 8/1994 Egyed .................. 475/281
7,338,408 B2   3/2008 Petrzik et al.
2008/0305931 A1 * 12/2008 Eich et al. .................. 477/174

FOREIGN PATENT DOCUMENTS

| DE | 102004018962 B3 | 10/2005 |
| EP | 0802355 A2 | 10/1997 |
| WO | WO-2004/097265 A1 | 11/2004 |
| WO | WO-2004/097266 | 11/2004 |

* cited by examiner

*Primary Examiner*—Yonel Beaulieu
(74) *Attorney, Agent, or Firm*—Simpson & Simpson, PLLC

(57) ABSTRACT

A method for controlling operation of a parallel transmission comprising two partial transmissions that act upon a common drive shaft and can be coupled to a drive shaft via one respective clutch. The gear ratio of the parallel transmission can be changed from the gear that is engaged in one partial transmission to the gear that is engaged in the other partial transmission without interrupting traction when the parallel transmission functions correctly by opening the clutch of one partial transmission and simultaneously closing the clutch of the other partial transmission. When a malfunction is detected in the actuator of at least one of the clutches, the open clutch can be closed only if at least one of the following conditions is met: the previously closed clutch is open; or, no gear is engaged in the partial transmission allocated to the previously closed clutch.

6 Claims, 2 Drawing Sheets

METHOD AND DEVICE FOR CONTROLLING THE OPERATION OF A PARALLEL SHIFTING TRANSMISSION

CROSS-REFERENCE TO RELATED APPLICATIONS

This application is a Continuation of International Patent Application Serial No. PCT/DE2007/000293, filed on Feb. 15, 2007, which application claims priority from German Patent Application No. DE 10 2006 010 628.8, filed on Mar. 8, 2006, which applications are incorporated herein by reference.

FIELD OF THE INVENTION

The invention relates to a method and a device for controlling the operation of a parallel shifting transmission.

BACKGROUND OF THE INVENTION

A method and a device are known from German Patent Application No. DE 10 2004 018 962 for controlling the operation of a parallel shifting transmission, wherein a hydraulic circuit contains a first and a second hydraulically actuatable clutch whose clutch pressure is regulated by means of respective pressure regulating valves, and wherein a safe state of the hydraulic circuit is supposed to be guaranteed by means of a safety circuit if a fault occurs. The safety circuit is designed so that if a partial fault occurs which is associated with only one of the two clutches, that clutch is disengaged, and so that if a total fault occurs, which is associated with both clutches, the clutch whose clutch pressure is lower when the total fault occurs is disengaged, and the other clutch, whose clutch pressure is greater when the total fault occurs, is not disengaged, in order to maintain the transmission of torque through that clutch. The result is that when a partial fault occurs that is associated with only one of the two clutches, the subtransmission associated with the other clutch can be operated like an automated shift gearbox, in which the gear step intervals of the parallel shift transmission are however very coarse. On the other hand, if a total fault occurs which is associated with both clutches, it is no longer possible to shift, but rather it is possible to drive in the gear that is engaged at the moment in the parallel shift transmission, until there is an opportunity to stop.

BRIEF SUMMARY OF THE INVENTION

The object of the invention is to create an opportunity in which it is possible to react flexibly to a malfunction in the clutch actuating device of a parallel shift transmission, and drivability is maintained to the greatest possible extent.

A solution to this problem is achieved with the present invention method set forth herebelow. Moreover, a device for carrying out the present invention method is also disclosed herein.

The present invention broadly comprises a method for controlling the operation of a parallel shift transmission having two subtransmissions that act on a common drive shaft, each of which is couplable with a drive shaft through a clutch, where when the parallel shift transmission is operating flawlessly the gear ratio of the parallel shift transmission can be changed from the gear selected in the one subtransmission to the gear selected in the other subtransmission without any interruption in traction by disengaging the clutch of the one subtransmission and simultaneously engaging the clutch of the other subtransmission, when a malfunction is detected in the actuating device of at least one of the clutches, the disengaged clutch can only be engaged if at least one of the following conditions is satisfied:
the previously engaged clutch is disengaged,
no gear is selected in the subtransmission associated with the previously engaged clutch.

The detected malfunction may consist for example in a self-disengaging function of at least one clutch being out of order.

A device for controlling the operation of a parallel shift transmission having two subtransmissions that act on a common drive shaft, each of which is couplable with a common drive shaft through a clutch, where during flawless operation the gear ratio of the parallel shift transmission can be changed from the gear selected in the one subtransmission to the gear selected in the other subtransmission without any interruption in traction by disengaging the clutch of the one subtransmission and simultaneously engaging the clutch of the other subtransmission, an actuator for operating one clutch includes sensors for detecting the position of one clutch each, and an electronic control device that controls the actuators for carrying out the method.

The effect of the present invention is that when a fault occurs in its gear step intervals the parallel shift transmission can be operated without change if possible, but that the shifting no longer takes place without any interruption in traction, but rather during shifting an interruption in traction occurs, albeit brief, as with a normal automated shift transmission.

The invention is described below on the basis of schematic drawings in exemplary form and with additional details.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
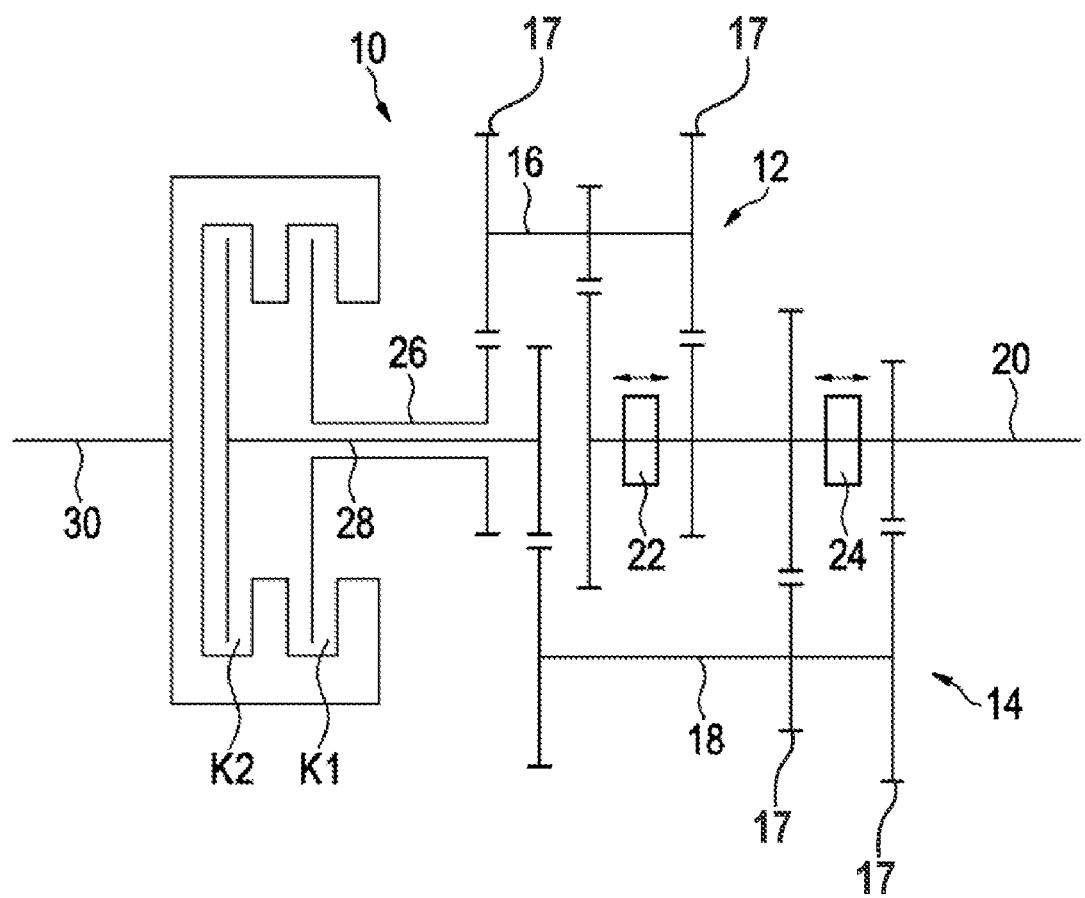
FIG. 1 is a schematic diagram of the layout of a parallel shift transmission with parts of a corresponding actuating device; and, FIG. 2 is a flow chart to explain the invention.
Figure 1:
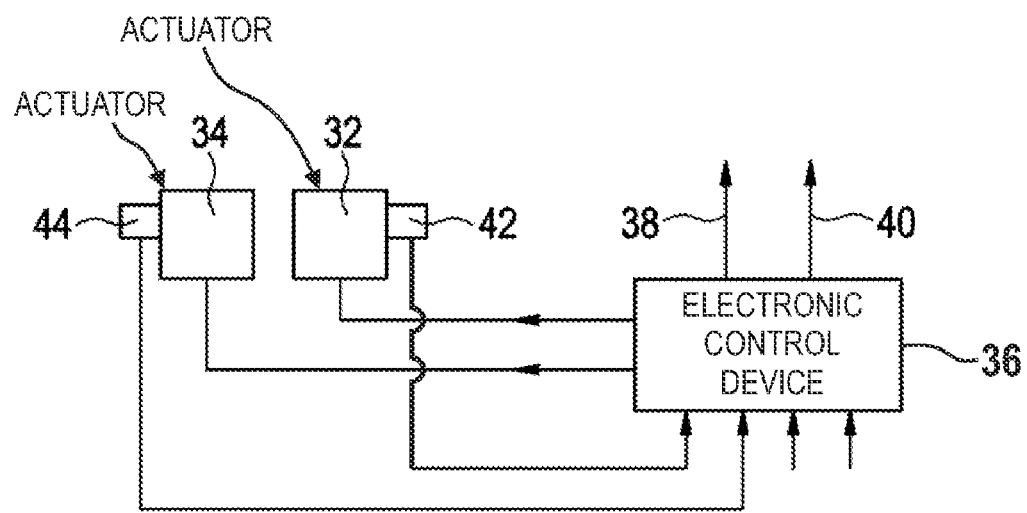

According to FIG. 1, a parallel shift transmission designated in its entirety as 10 has two subtransmissions 12 and 14. Each of the subtransmissions has input shaft 16 or 18, respectively, on which fixed gears 17 mesh with idler gears supported on common output shaft 20 for both subtransmissions 12 and 14. The idler gears are couplable with output shaft 20 in rotationally fixed connections by way of shifting devices 22 and 24. Input shaft 16 is connected in a rotationally fixed connection through a pair of gears to hollow shaft 26, through which shaft 28 passes which is connected in a rotationally fixed connection through a pair of gears to input shaft 18. Hollow shaft 26 is couplable through clutch K1 to drive shaft 30, for example, the crankshaft of a combustion engine. Shaft 28 is couplable through clutch K2 to drive shaft 30. The clutches, arranged coaxially relative to each other, which together form a double clutch, are depicted only schematically and without their actuating elements. The function of the dual clutch transmission is known, and therefore will not be explained.

To operate clutches K1 and K2, actuators 32 and 34 are provided, which are actuated by an electronic control device 36, which controls shifting devices 22 and 24 through additional outputs 38 and 40.

Actuators 32 and 34 can be connected to actuating elements of clutches K1 and K2, for example, their respective clutch operating levers, directly through connecting elements or through an interposed hydraulic link. The actuators can be electric motors, hydraulic cylinders, etc. To detect the position of the actuators or the actuating elements of the clutches, sensors 42 and 44 are provided, whose output signals are fed to electronic control device 36. Signals according to which the operation of parallel shift transmission 10 is controlled are fed to control device 36 through additional inputs.

Sensors 42 and 44 may be incremental sensors, for example, so that the position of the actuating elements is referenced in a known manner.

The arrangement is known, and therefore will not be explained in further detail.

One characteristic feature of parallel shift transmissions is that when a gear is selected in each of subtransmissions 12 and 14, both clutches K1 and K2 may not be closed, since this could result in destruction of the transmission or sudden blocking, because of the match with the speed of rotation of the output shaft. Clutches K1 and K2 are therefore preferably designed so that they are pressed into the engaged position by the actuators, and are automatically forced into their disengaged position by opening springs within the clutch when the actuators are turned off. If this self-disengaging function of the clutches, which contributes to the operating reliability of the parallel shift transmission, is out of order, for example, as a consequence of increased friction, wear, a change in the characteristic curve of the opening springs, etc., dangerous operating states can arise, since it can come about that one clutch is engaged while the other clutch is not completely disengaged.

A fault in the automatic disengagement can be detected, for example, by the fact that the failure to reach an opening stop is sensed in a previously known manner.

According to the invention, when a fault is detected in the automatic disengagement function, a program is activated in electronic control device 36 in which the parallel shift transmission is no longer controlled in such a way that the change from one gear to a different gear is accomplished merely by changing from the one subtransmission whose clutch is engaged at the moment to the other subtransmission by disengaging the engaged clutch and simultaneously engaging the formerly disengaged clutch and driving the parallel shift transmission with the gear already selected in the new subtransmission before the clutch associated with it was engaged.

When the system shifts to the error program upon detection of a fault in the self-disengaging function of the clutches, the parallel shift transmission is operated as if it were assembled from two subtransmissions, between which it is not possible to shift without an interruption of traction, but rather as in the case of automated shift transmissions with interruption of traction. This occurs because the clutches K1 and K2 can only be engaged when there is assurance that the other clutch is disengaged and/or no gear is selected in the subtransmission associated with the formerly engaged clutch. It should be appreciated that the "new" clutch can also be engaged if no gear is selected in the subtransmission associated with it.

Figure 2:
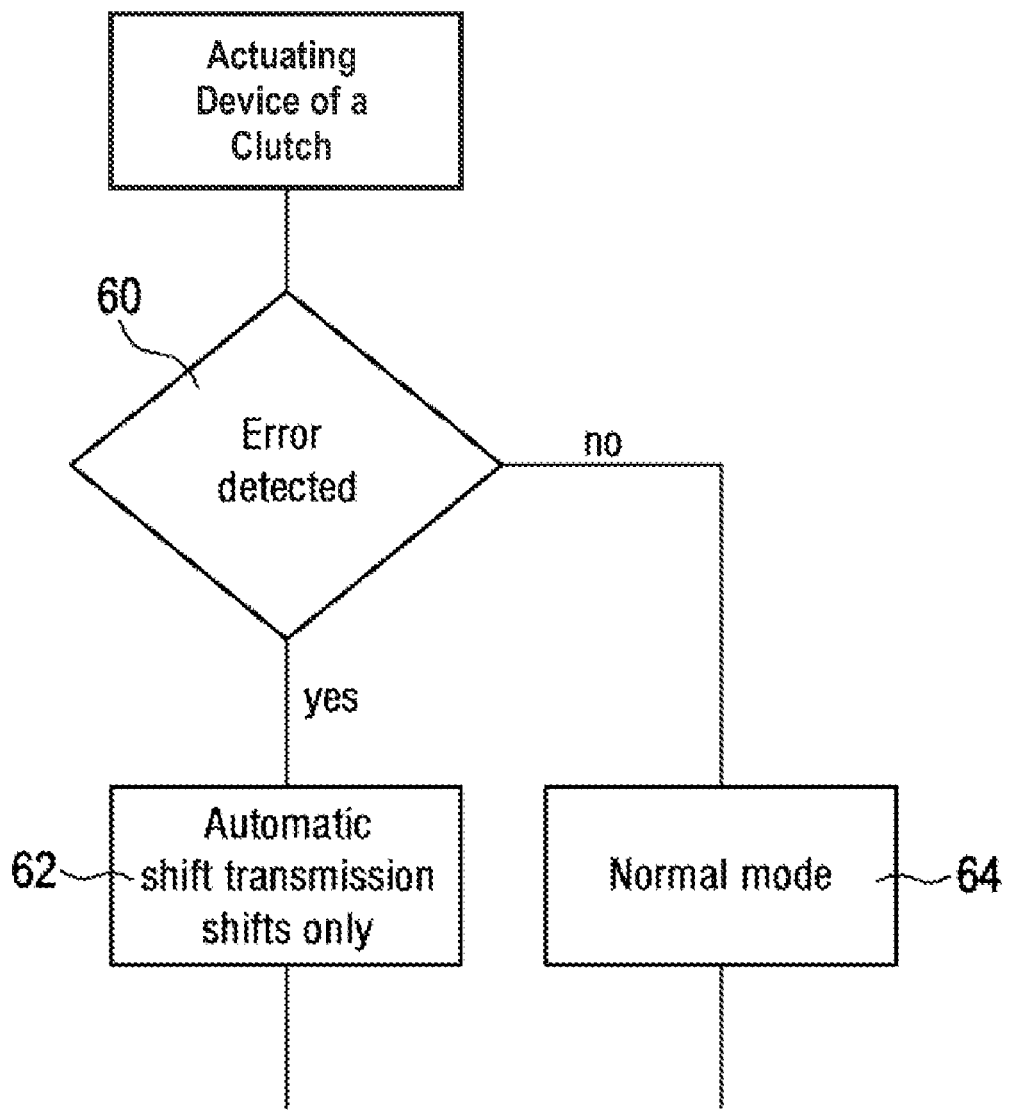

FIG. 2 depicts the present invention process schematically. If a fault relating to a self-disengaging function of one of the clutches is detected in control device 36 in step 60, in step 62, the error program is activated, which permits only shifts such as are possible in automatic shift transmissions, i.e., which take place with interruption of traction. If a fault is detected, the parallel shift transmission continues to be operated in normal mode (step 64).

In normal mode for example, the self-disengaging function of clutches K1 and K2 can be used by switching off the actuator belonging to the clutch to be disengaged, so that the clutch automatically moves to the disengaged position and the actuator of the other clutch is actuated to engage the latter. Operation is also possible in such a way that both clutches are moved to their disengaged position and their engaged position actively by the associated actuators. The self-disengaging function of the clutch is then an additional safety feature that prevents dangerous states when the actuator of a clutch fails. The self-disengaging function is checked routinely in a test program.

In operation corresponding to the error program (only automatic shift transmission shifting possible), clutches K1 and K2 are actively forced into their disengaged position and their engaged position by associated actuators 32 and 34. It should be appreciated that when a fault is detected in step 60, a warning signal can be displayed for the driver, so that the driver is made aware right from the start that the shifting is no longer free of traction interruptions. In the event of a serious fault, as a result of which one of the clutches can no longer be moved out of its disengaged position, the subtransmission associated with the clutch that continues to be functional can be operated like an automated shift transmission, so that the parallel shift transmission can only be operated with shifts from one gear into the gear two levels away.

For reasons of safety, the error program activated in step 62 can be activated in the event of a great variety of faults, not only in the event of a fault in the automatic return to the disengaged position of the clutch.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE LABELS 10 parallel shift transmission
12 subtransmission
14 subtransmission
16 input shaft
17 fixed gear
18 input shaft
20 output shaft
22 shifting device
24 shifting device
26 hollow shaft
28 shaft
30 drive shaft
32 actuator
34 actuator
36 electronic control device
38 output
40 output
42 sensor
44 sensor

What is claim is:

1. A method for controlling operation of a parallel shift transmission having first and second subtransmissions that act on a common drive shaft, said first and second subtransmissions are couplable with a drive shaft through first and second clutches, respectively, wherein one of said first and second clutches is an engaged clutch and the other of said first and second clutches is a disengaged clutch, said method comprising the steps of:
   during errorless operation of said parallel shift transmission, changing a gear ratio of said parallel shift transmission from a first gear selected in said first subtransmission to a second gear selected in said second subtransmission without any interruption in traction, by disengaging said first clutch of said first subtransmission and simultaneously engaging said second clutch of said second subtransmission,
   when a malfunction is detected in an actuating device of at least one of said first and second clutches, engaging the disengaged clutch only if at least one of the following conditions is satisfied:
   a) a previously engaged clutch becomes disengaged; or,
   b) no gear is selected in the subtransmission associated with the previously engaged clutch.

2. The method according to claim 1 further comprising the step of:
   determining whether said parallel shift transmission is in an errorless operation condition or in a malfunction condition.

3. The method according to claim 1, wherein the malfunction comprises a self-disengaging function being out of order of at least one of said first or second clutches.

4. An apparatus for controlling operation of a parallel shift transmission having first and second subtransmissions that act on a common output shaft, said first and second subtransmissions are couplable with a common drive shaft through first and second clutches, respectively, wherein during errorless operation of the parallel shift transmission a gear ratio of the parallel shift transmission is changeable from a first gear selected in said first subtransmission to a second gear selected in said second subtransmission without any interruption in traction by disengaging said first clutch of said first subtransmission and simultaneously engaging said second clutch of said second subtransmission, said apparatus comprising:
   first and second actuators arranged to operate said first and second clutches, respectively;
   at least one sensor arranged to detect a position of an actuating element of each of said first and second clutches; and,
   an electronic control device arranged to control said first and second actuators to carry out a method comprising the steps of:
      during errorless operation of said parallel shift transmission, changing a gear ratio of said parallel shift transmission from a first gear selected in said first subtransmission to a second gear selected in said second subtransmission without any interruption in traction, by disengaging said first clutch of said first subtransmission and simultaneously engaging said second clutch of said second subtransmission,
      when a malfunction is detected in an actuating device of at least one of said first and second clutches, engaging the disengaged clutch only if at least one of the following conditions is satisfied:
      a) a previously engaged clutch becomes disengaged; or,
      b) no gear is selected in the subtransmission associated with the previously engaged clutch.

5. The apparatus according to claim 4 wherein the method further comprises the step of:
   determining whether said parallel shift transmission is in an errorless operation condition or in a malfunction condition.

6. The apparatus according to claim 4, wherein the malfunction comprises a self-disengaging function being out of order of at least one of said first or second clutches.

* * * * *